US010661757B2

(12) United States Patent
Gage et al.

(10) Patent No.: US 10,661,757 B2
(45) Date of Patent: May 26, 2020

(54) SYSTEMS, VEHICLES, AND METHODS FOR AUTOMATICALLY DEPLOYING A WINDSHIELD WIPER BLADE TO A DEPLOYED POSITION

(71) Applicant: Toyota Motor Engineering & Manufacturing North America, Inc., Erlanger, KY (US)

(72) Inventors: Sergei I. Gage, Redford, MI (US); Arata Sato, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 356 days.

(21) Appl. No.: 15/276,279

(22) Filed: Sep. 26, 2016

(65) Prior Publication Data

US 2018/0086310 A1 Mar. 29, 2018

(51) Int. Cl.
*B60S 1/04* (2006.01)
*B60S 1/08* (2006.01)

(52) U.S. Cl.
CPC .......... *B60S 1/0866* (2013.01); *B60S 1/0455* (2013.01); *B60S 1/0818* (2013.01); *B60S 1/0896* (2013.01)

(58) Field of Classification Search
CPC ...... B08B 1/005; B60S 1/0866; B60S 1/0874; B60S 1/0455
See application file for complete search history.

(56) References Cited

U.S. PATENT DOCUMENTS 6,150,639 A * 11/2000 Ruan ..................... B60S 1/0818
219/494
8,941,344 B2 1/2015 Wilson

FOREIGN PATENT DOCUMENTS

| CN | 102658809 B | 5/2014 | |
|---|---|---|---|
| DE | 19936277 A1 | 2/2001 | |
| DE | 102004022122 A1 | 11/2005 | |
| DE | 102006061631 A1 * | 7/2008 | ............ B60S 1/0818 |
| IN | 201505836 | 11/2015 | |
| JP | 2008056218 A | 3/2008 | |
| KR | 20030072894 A | 9/2003 | |

OTHER PUBLICATIONS

DE102006061631 machine translation; Zimmer, J. (Year: 2008).*

* cited by examiner

*Primary Examiner* — Mikhail Kornakov
*Assistant Examiner* — Natasha N Campbell
(74) *Attorney, Agent, or Firm* — Dinsmore & Shohl LLP (57) ABSTRACT

A system for automatically deploying a windshield wiper blade to a deployed position includes one or more processors, an actuator coupled to the windshield wiper blade and communicatively coupled to the one or more processors, one or more optical sensors communicatively coupled to the one or more processors that output an optical signal, and one or more memory modules communicatively coupled to the one or more processors. The one or more memory modules store logic that when executed by the one or more processors cause the one or more processors to receive the optical signal output by the one or more optical sensors, detect whether an accumulation of a substance has formed on the vehicle based on the optical signal output by the one or more optical sensors, and deploy, with the actuator, the windshield wiper blade to the deployed position in response to detecting the accumulation of the substance.

20 Claims, 8 Drawing Sheets

SYSTEMS, VEHICLES, AND METHODS FOR AUTOMATICALLY DEPLOYING A WINDSHIELD WIPER BLADE TO A DEPLOYED POSITION

TECHNICAL FIELD

The present specification generally relates to systems, vehicles, and methods for automatically deploying a windshield wiper blade to a deployed position and, more specifically, systems, vehicles, and methods for automatically deploying a windshield wiper blade to a deployed position when it is determined that an accumulation has accumulated on a vehicle windshield.

BACKGROUND

Vehicle operators often encounter snow and/or ice that accumulates on the window wiper assembly either while the vehicle is parked outside in the winter weather conditions and/or while operating the vehicle during periods of precipitation in below freezing temperatures. The accumulated snow and/or ice often cause the windshield wiper blades to adhere to the windshield and lose their effectiveness in clearing the window. This may result in poor visibility. In order to prevent this from occurring, some drivers manually raise the wiper blades from the windshield upon exiting the vehicle when inclement weather is occurring or expected. However, such preventative measures may be forgotten or overlooked when the vehicle operator exits the vehicle.

Accordingly, a need exists for alternative systems vehicles, and methods for automatically deploying a windshield wiper blade to a deployed position.

SUMMARY

In one embodiment, a system for automatically deploying a windshield wiper blade to a deployed position is provided. The system may include one or more processors; an actuator coupled to the windshield wiper blade and configured to selectively deploy the windshield wiper blade to the deployed position in which the windshield wiper blade is spaced apart from the vehicle windshield, wherein the actuator is communicatively coupled to the one or more processors, and one or more optical sensors communicatively coupled to the one or more processors that output an optical signal. The one or more memory modules store logic that when executed by the one or more processors causes the one or more processors to receive the optical signal output by the one or more optical sensors, detect whether an accumulation of a substance has formed on the vehicle windshield based on the optical signal output by the one or more optical sensors, and deploy, with the actuator, the windshield wiper blade to the deployed position in which the windshield wiper blade is spaced apart from the vehicle windshield in response to detecting the accumulation of the substance.

In another embodiment, a vehicle for automatically deploying a windshield wiper blade to a deployed position is provided. The vehicle may include a vehicle windshield and a windshield wiper blade configured to be moved between an un-deployed position in which the windshield wiper blade is in contact with the vehicle windshield and a deployed position in which the windshield wiper blade is spaced apart from the vehicle windshield. The vehicle further includes one or more processors; an actuator coupled to the windshield wiper blade and configured to selectively deploy the windshield wiper blade to the deployed position in which the windshield wiper blade is spaced apart from the vehicle windshield, wherein the actuator is communicatively coupled to the one or more processors, and one or more optical sensors communicatively coupled to the one or more processors that output an optical signal. The one or more memory modules store logic that when executed by the one or more processors causes the one or more processors to receive the optical signal output by the one or more optical sensors, detect whether an accumulation of a substance has formed on the vehicle windshield based on the optical signal output by the one or more optical sensors, and deploy, with the actuator, the windshield wiper blade to the deployed position in which the windshield wiper blade is spaced apart from the vehicle windshield in response to detecting the accumulation of the substance.

In yet another embodiment, a method to automatically deploy a windshield wiper blade to a deployed position may include receiving an optical signal output from one or more optical sensors, detecting whether an accumulation of a substance has formed on a vehicle windshield based on the optical signal output by the one or more optical sensors, and deploying, with an actuator, the windshield wiper blade to the deployed position in which the windshield wiper blade is spaced apart from the vehicle windshield in response to detecting the accumulation of the substance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include systems, methods, and vehicles for automatically deploying a windshield wiper blade to a deployed position in response to detecting an accumulation of a substance having been formed on a windshield. Embodiments described herein may use various environmental indicators to determine whether or not an accumulation of a substance (e.g., snow and/or ice) has accumulated on a vehicle. For example, optical sensors may use optical cues (e.g., images, light, etc.) to determine that an accumulation of the substance has formed on the vehicle. In such instances, the windshield wiper blades may be actuated to a deployed position to keep the windshield wiper blades from adhering to the windshield. The various systems, vehicles, and methods for deploying a windshield wiper blade to a deployed position will be described in more detail herein with specific reference to the corresponding drawings.

As used herein, the term "deployed position" refers to the windshield wiper blade being moved to a position spaced apart from a vehicle windshield such that the windshield wiper blade does not contact the vehicle windshield. As such, the term "un-deployed position" generally refers to a position of the windshield wiper blade, wherein the windshield wiper blade is in contact with the vehicle windshield.

As used herein the term "accumulation of a substance" generally refers to snow and/or ice having amassed on a body of a vehicle. For example, and not as a limitation, snow having accumulated on a vehicle windshield is an accumulation of a substance.

Figure 1:
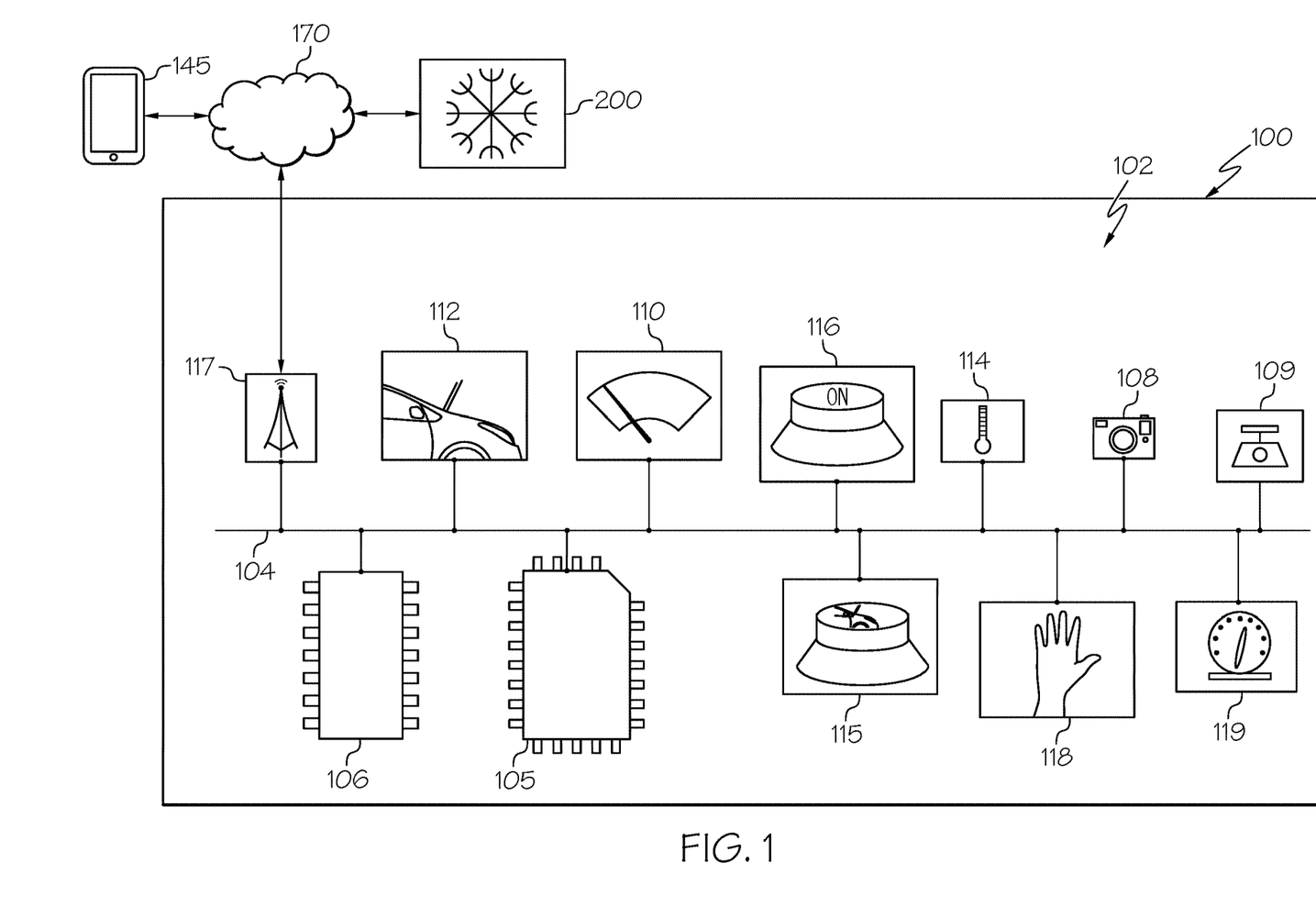
FIG. 1 depicts a schematic view of a system for automatically deploying a windshield wiper blade to a deployed position, according to one or more embodiments shown and described herein.

Referring now to the drawings, FIG. 1 depicts a system 102 of a vehicle 100 for automatically deploying a windshield wiper blade 110 to a deployed position. The system 102 includes a communication path 104, one or more processors 105, one or more memory modules 106, one or more optical sensors 108, a windshield wiper blade 110, and an actuator 112. The system 102 may further include network interface hardware 117, a weight sensor 109, a temperature sensor 114, a vehicle on/off sensor 116, a manual deployment input mechanism 115, a manual deployment sensor 118, and a timer 119. In some embodiments, the system 102 may be configured to communicate with a network 170 using the network interface hardware 117 to gather predicted weather data 200. In yet further embodiments, the system 102 may be configured to communicate over the network 170 with the network interface hardware 117 to send and receive information from one or more mobile devices 145.

As described above, the system 102 includes a communication path 104 that provides data interconnectivity between various modules disposed within the system 102. Specifically, each of the modules can operate as a node that may send and/or receive data. In some embodiments, the communication path 104 includes a conductive material that permits the transmission of electrical data signals to processors, memories, sensors, and actuators throughout the system 102. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system 102 includes one or more processors 105 communicatively coupled with one or more memory modules 106. The one or more processors 105 may include any device capable of executing machine-readable instructions stored on a non-transitory computer-readable medium. Accordingly, each processor 105 may include a controller, an integrated circuit, a microchip, a computer, and/or any other computing device.

The one or more memory modules 106 are communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 102 and/or external to the system 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As described above, the system 102 further includes one or more optical sensors 108. The one or more optical sensors 108 may be any sensor capable of producing an optical signal indicative of an accumulation of a substance forming on the vehicle 100. The one or more optical sensors 108 may include, but are not limited to, cameras, laser scanners, and IR scanners. The one or more processors 105 may receive image data and/or light data from the one or more optical sensors 108 and determine from said data that an accumulation of a substance has formed on the vehicle 100. For example, and not as a limitation, the one or more optical sensors 108 may output an optical signal indicative of an intensity of light. From the optical signal, the one or more processors 105 may determine a level of light obstruction based on the optical signal. For example, when there is an accumulation of a substance, such as snow, built up on a vehicle 100, the accumulation of the substance may block out light that would otherwise be detected by the one or more optical sensors 108. In this way the one or more processors 105, based on the optical signal output by the one or more optical sensors 108, may determine that an accumulation of a substance has formed on the vehicle 100.

The one or more optical sensors 108 may be positioned at a variety of locations on the vehicle 100. For example, and not as a limitation, the one or more optical sensors 108 may be positioned proximate to a roof of the vehicle 100 such as behind a rearview mirror 152 as depicted in FIGS. 3-6. In some embodiments, the one or more optical sensors 108 may be located at a position proximate to the windshield wiper blades 110 themselves, such as near a base of the windshield 150 or on the windshield wiper blades 110 themselves. It is noted that other types of sensors, beyond the one or more optical sensors 108, may be utilized that output a signal indicative of an accumulation of a substance forming on a vehicle 100.

For example, in some embodiments, the system 102 may include a weight sensor 109 communicatively coupled to the one or more processors 105 that outputs a weight signal. Based on the weight signal the one or more processors 105 may execute logic stored in the one or more memory modules 106 to determine that an accumulation of a substance has formed on the vehicle 100. The weight sensor 109 may be included in addition to or instead of the one or more optical sensors 108. As an example, and not as a limitation, the weight sensor 109 may be coupled to a windshield wiper blade 110 of the vehicle 100 and outputs a weight signal indicative of whether a weight has formed on the windshield wiper blade 110. If a weight has formed on the windshield wiper blade 110, the one or more processors 105 may determine, based on the weight signal output by the weight sensor 109, that an accumulation of a substance has formed on the vehicle 100. In other embodiments, the weight sensor 109 may detect weight formed on other portions of the vehicle (e.g., hood, roof, and/or windshield).

As described above, the system 102 further includes a windshield wiper blade 110. The windshield wiper blade 110 may be of any construction. The windshield wiper blade 110 may generally be coupled to the vehicle 100 proximate to a base of a windshield 150 of the vehicle 100, as shown in FIGS. 3-6. The windshield 150 may refer to either a front windshield 150 of the vehicle 100 or a rear windshield 150 of the vehicle 100. Generally, a vehicle 100 includes two windshield wiper blades 110 at the front windshield 150 and one windshield wiper blade 110 at the rear windshield 150, though some vehicles include no rear windshield wiper blade 110. The windshield wiper blade 110 is configured to swipe across the windshield 150 of the vehicle 100 to remove rain, snow, and debris.

Figure 4:
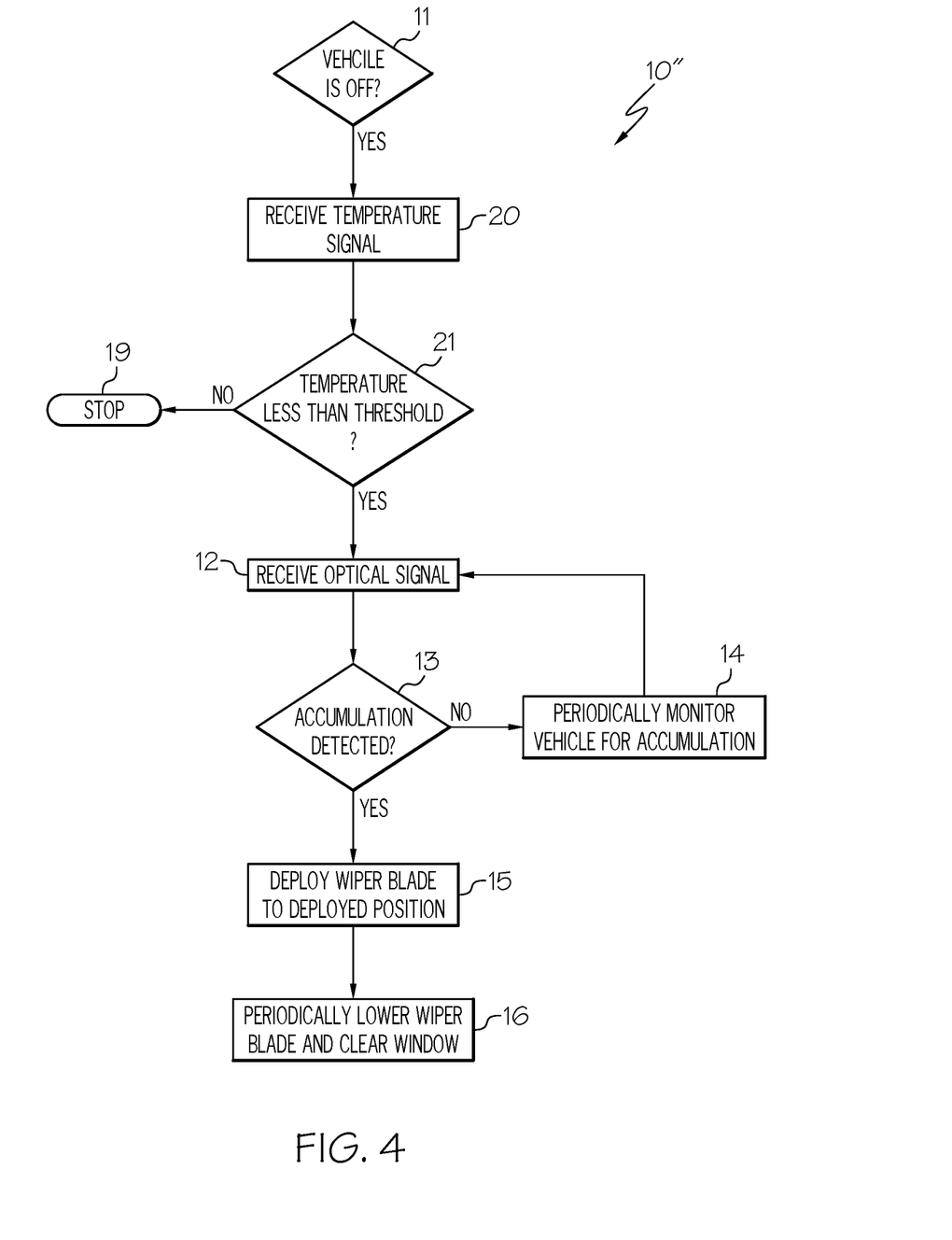
FIG. 4 depicts another flowchart illustrating a method for automatically deploying a windshield wiper blade to a deployed position, according to one or more embodiments shown and described herein.
Figure 5:
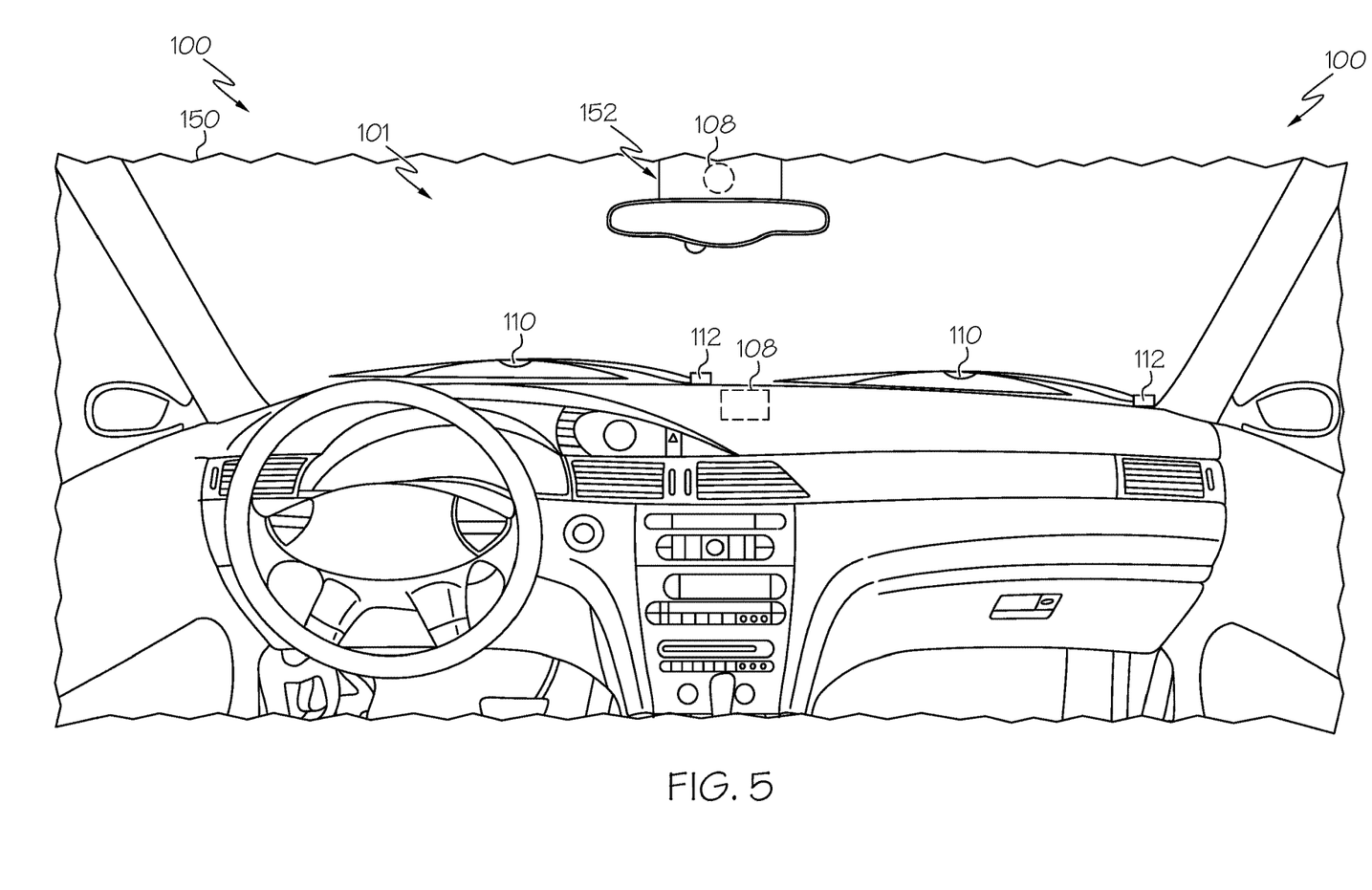
FIG. 5 depicts of an interior of a vehicle having a windshield and windshield wiper blades, according to one or more embodiments shown and described herein.
Figure 6:
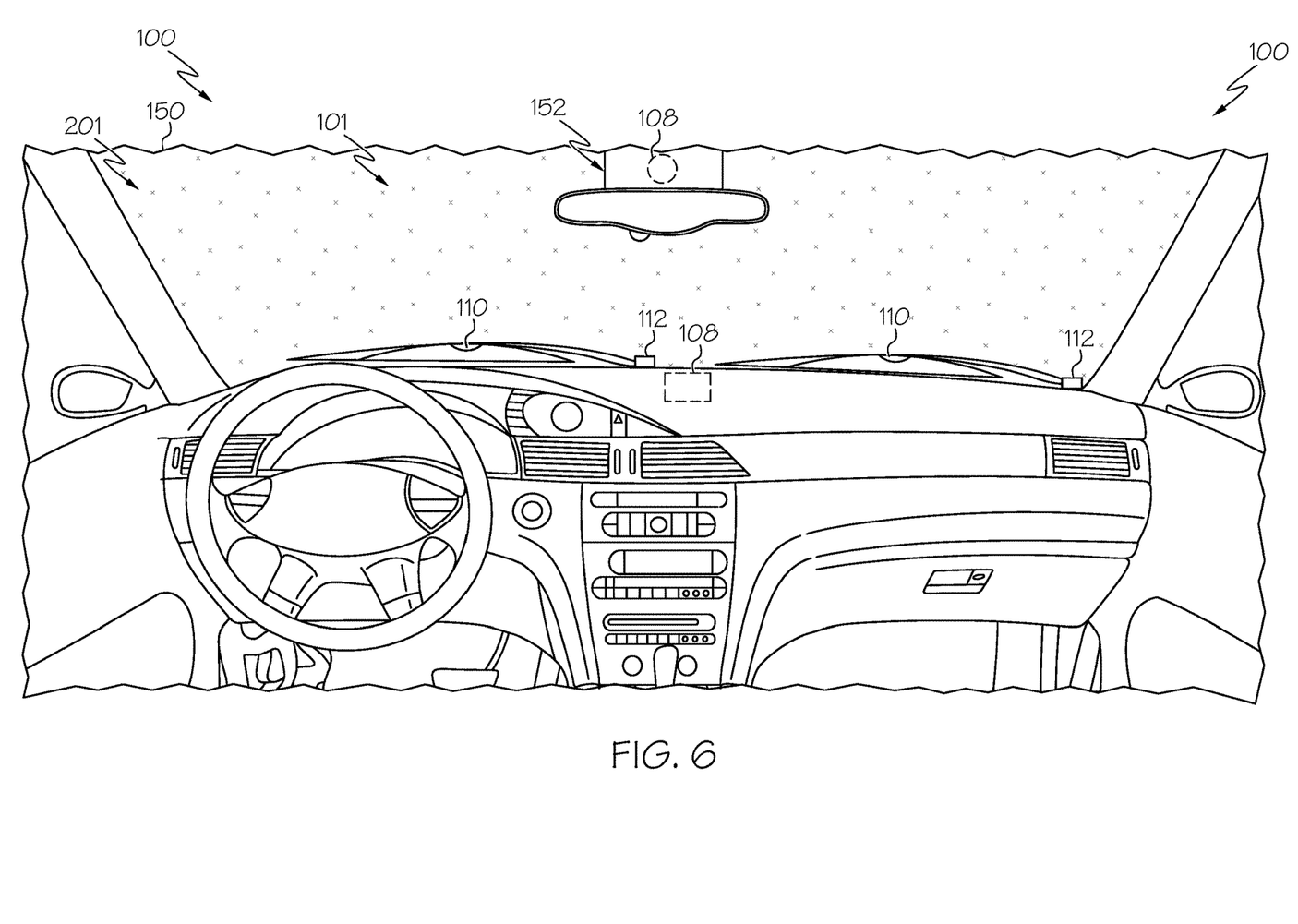
FIG. 6 depicts the interior of the vehicle of FIG. 3 wherein it is shown to be snowing in an environment of the vehicle, according to one or more embodiments shown and described herein.

Coupled to the windshield wiper blade 110 is an actuator 112 (schematically depicted in FIGS. 3-6) configured to move the windshield wiper blade 110 from an un-deployed position (depicted in FIGS. 3 and 4) to a deployed position (depicted in FIGS. 5 and 6). In some embodiments, the actuator 112 is configured to move the windshield wiper blade 110 from the deployed position back to the un-deployed position. Referring again to FIG. 1, the actuator 112 is communicatively coupled to the one or more processors 105, such that the one or more processors 105 execute logic stored in the one or more memory modules 106 to move the windshield wiper blade 110 as described above. The actuator 112 may be DC motor, a stepper motor, or any other actuator capable of deploying a windshield wiper blade 110 from an un-deployed position to a deployed position and vice-versa.

As described above, the system 102 may further include a temperature sensor 114 communicatively coupled to the one or more processors 105 over the communication path 104. The temperature sensor 114 may be any sensor that is configured to output a temperature signal indicative of a temperature of an environment of the vehicle 100. The one or more processors 105 may determine, based on the temperature signal received from the temperature sensor 114, whether there is a likelihood that an accumulation of a substance will form on the vehicle 100. For example, and not as a limitation, if the one or more processors 105 determined, based on the temperature signal of the temperature sensor 114, that the temperature of the environment of the vehicle 100 is near or below freezing (e.g. 32° F., then there is an increased likelihood that an accumulation of a substance (e.g., snow or ice) may form on the vehicle 100. This will be described in greater detail below.

As described above, the system 102 may include a vehicle on/off sensor 116. The vehicle on/off sensor 116 may be communicatively coupled to the one or more processors 105 to provide a vehicle on/off signal indicative of whether the vehicle 100 is on or off. The vehicle on/off sensor 116 may be any suitable sensor that can detect or be used to detect whether the vehicle 100 is on or off. For example, and not as a limitation the vehicle on/off sensor 116 may output a signal indicative of the vehicle 100 being in an operational state. For example, wherein the vehicle 100 is a combustion engine vehicle, the vehicle on/off sensor 116 may output a signal indicative of the engine of the vehicle 100 being in operation. In embodiments wherein the vehicle 100 is an electric or hybrid vehicle, the vehicle on/off sensor 116 may output a signal indicative of an electric motor of the vehicle 100 being in an operational state. As described herein, the system 102 causes the windshield wiper blade 110 to be deployed to a deployed position when it is determined based on the vehicle on/off signal of the vehicle on/off sensor 116 that the vehicle 100 is off.

As described above, the system 102 may further include a manual deployment input mechanism 115 communicatively coupled to the one or more processors 105 over the communication path 104. By actuating the manual deployment input mechanism 115, a signal may be received by the one or more processors 105 to move the windshield wiper blade 110 to one of a deployed position or an un-deployed position. For example, if the windshield wiper blade 110 is in an un-deployed position when the manual deployment input mechanism 115 is actuated, the one or more processors 105 may execute logic to deploy the windshield wiper blade 110 to the deployed position. If, on the other hand, the windshield wiper blade 110 is in a deployed position when the manual deployment input mechanism 115 is actuated, the one or more processors 105 may execute logic to move the windshield wiper blade 110 to an un-deployed position.

The manual deployment input mechanism 115 may be any device capable of transforming mechanical, optical, or electrical signals into a data signal capable of being transmitted with the communication path 104. For example, the manual deployment input mechanism 115 may include any number of movable objects that each transforms physical motion into a data signal that can be transmitted over the communication path 104 such as, for example, a button, a switch, a knob, a microphone or the like. In some embodiments, the manual deployment input mechanism 115 may be integrated into a touchscreen display (not shown) of the vehicle 100. While the system 102 includes a manual deployment input mechanism 115 in the embodiment depicted in FIG. 1, the system 102 may not include a manual deployment input mechanism 115 in other embodiments.

As described above, the system 102 may further include a manual deployment sensor 118 communicatively coupled to the one or more processors 105. The manual deployment sensor 118 may be any sensor the outputs a manual deployment signal indicative of the windshield wiper blade 110 being placed in a deployed position manually. For example, manually placing the windshield wiper blade 110 into the deployed position may include but is not limited to, physically placing the windshield wiper blade 110 into the deployed position, actuating the manual deployment input mechanism 115, and remotely instructing the system 102 to place the windshield wiper blade 110 into the deployed position as described herein. In such instances, the one or more processors 105 may assign a time stamp to an instance of manual deployment and store the time stamp on the one or more memory modules 106 as manual deployment data. The one or more processors 105 may use the manual deployment data to run a predictive algorithm to predict a likelihood that an accumulation of a substance will form on the vehicle 100. A user manually deploying the windshield wiper blade 110 to a deployed position may be indicative of a likelihood of inclement weather which may cause an accumulation of a substance to form on a vehicle 100. For instance, if it is determined, based on the predictive algorithm, that a user generally manually deploys her windshield wiper blade 110 to a deployed position at 8 AM on Wednesdays, it may be surmised that the user generally parks the vehicle 100 outside on Wednesdays at 8 AM and it may be prudent to monitor the vehicle 100 for an accumulation of a substance to form thereon.

Some embodiments may further include a timer 119 communicatively coupled to the one or more processors 105. The timer 119 may output a time signal to the one or more processors 105 indicative of a predetermined amount of time passing. For example, the one or processors 105 may wait a predetermined amount of time after the vehicle 100 has been turned off, as indicated by the vehicle on/off sensor 116, to deploy the windshield wiper blade 110 to the deployed position. Furthermore, in some embodiments, the timer 119 may aid the one or more processors 105 in periodically moving the windshield wiper blades 110 from the deployed position to an un-deployed position to clear the window before raising the windshield wiper blade 110 back to a deployed position. This and other embodiments will be described in more detail with reference to FIGS. 2-6 below.

In some embodiments, the system 102 further includes network interface hardware 117 for communicatively coupling the system 102 with a network 170, depicted in FIG. 1. The network interface hardware 117 can be communicatively coupled to the communication path 104 and can be any device capable of transmitting and/or receiving data via the network 170. Accordingly, the network interface hardware 117 can include a communication transceiver for sending and/or receiving any wired or wireless communication. For example, the network interface hardware 117 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 117 includes hardware configured to operate in accordance with the Bluetooth wireless communication protocol. In another embodiment, network interface hardware 117 may include a Bluetooth send/receive module for sending and receiving Bluetooth communications to/from the one or more mobile devices 145.

As described above, the system 102 may communicate, through the network interface hardware 117, with a network 170 to communicatively couple the system 102 with one or more mobile devices 145 and/or one or more servers storing predicted weather data 200. In one embodiment, the network 170 is a personal area network that utilizes Bluetooth technology to communicatively couple the system 102 and the one or more mobile devices 145. In other embodiments, the network 170 may include one or more computer networks (e.g., a personal area network, a local area network, or a wide area network), cellular networks, satellite networks and/or a global positioning system and combinations thereof. Accordingly, the system 102 can be communicatively coupled to the network 170 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the one or more processors 105 may receive instructions over the network interface hardware 117 by the user from one or more mobile devices 145. In embodiments described herein, the one or more mobile devices 145 may include mobile phones, smartphones, personal digital assistants, dedicated mobile media players, mobile personal computers, laptop computers, and/or any other mobile devices capable of being communicatively coupled with the system 102. In such embodiments, the user may communicate remotely with the vehicle 100 using the one or more mobile devices 145 to cause the one or more processors 105 to deploy the windshield wiper blade 110 to a deployed position instead of waiting for the system 102 to detect an accumulation of a substance formed on the vehicle 100.

As described above, the one or more processors 105 may receive predicted weather data 200 over the network 170 through the network interface hardware 117. The predicted weather data 200 may be stored on one or more remote servers (not shown). The one or more processors 105 may use the predicted weather data 200 to determine whether there is a predicted accumulation of a substance. For instance, if a weather report contained within the predicted weather data 200 predicts that there will be snow, the one or more processors 105 may determine that there is a predicted accumulation of a substance. In instances where there is a predicted accumulation of a substance determined by the one or more processors 105, the one or more processors 105 may periodically monitor the vehicle 100 with the one or more optical sensors 108 for the predicted accumulation of the substance to begin accumulating on the vehicle 100. Such periodic monitoring may occur, in some instances, more or less than every hour.

Figure 2:
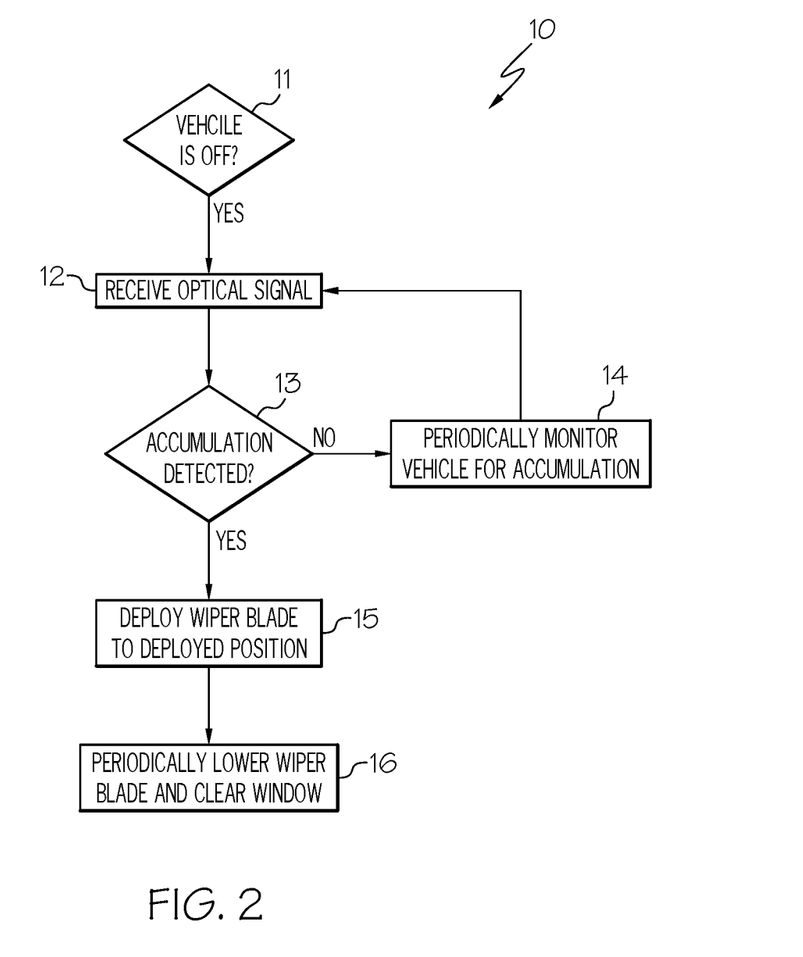
FIG. 2 depicts a flowchart illustrating a method for automatically deploying a windshield wiper blade to a deployed position, according to one or more embodiments shown and described herein.

FIG. 2 depicts a flowchart 10 for automatically deploying a windshield wiper blade 110 to a deployed position according to embodiments disclosed herein. Referring to FIGS. 1 and 2 collectively, at block 11, it is determined if the vehicle 100 is shut down (i.e., off). As described above, the system 102 includes a vehicle on/off sensor 116 that outputs a vehicle on/off signal to the one or more processors 105 indicative of whether the vehicle 100 is off. At block 12, when it is determined that the vehicle 100 is off, the system 102 receives with the one or more processors 105 the optical signal from the one or more optical sensors 108. It is noted however, that in some embodiments, the vehicle 100 may not need to be off.

Figure 8:
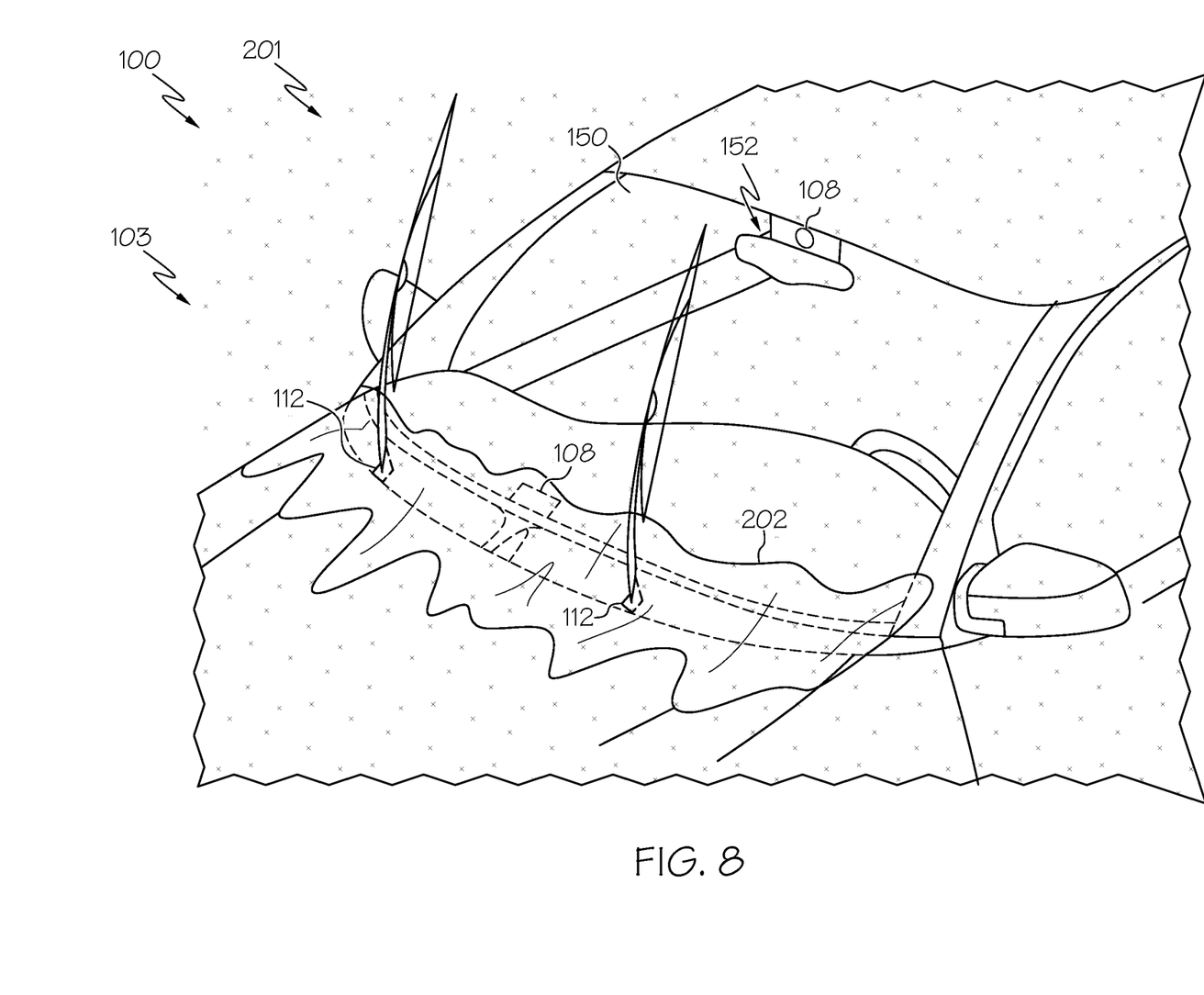
FIG. 8 depicts an exterior perspective view of the vehicle of FIG. 5, according to one or more embodiments shown and described herein.

At block 13 it is determined whether or not an accumulation of a substance has formed on the vehicle 100. As described above, the one or more optical sensors 108 output an optical signal. Based on the optical signal from the one or more optical sensors 108, the one or more processors 105 may detect whether an accumulation of a substance has formed on the vehicle 100. In some instances, the one or more processors may only detect whether an accumulation of a substance has been formed on a front portion 103 of the vehicle 100 (as depicted in FIG. 8). In some embodiments, the one or more processors 105 may only detect whether an accumulation of a substance has been formed on a vehicle windshield 150 (illustrated in FIGS. 5-8). However, in other embodiments, the one or more optical sensors 108 may indicate that an accumulation of a substance has formed elsewhere on the vehicle 100. Referring briefly to FIG. 5, a view of an interior 101 of the vehicle 100 directed toward a windshield 150 of the vehicle 100 is depicted. No substance is shown to have accumulated on the vehicle 100. Furthermore, there is no indication, in FIG. 5, that an accumulation of a substance is imminent. In this case, the one or more processors 105 would not detect an accumulation of a substance on the vehicle 100 based on the optical signal output by the one or more optical sensors 108. As such, the one or more processors 105 would not deploy the windshield wiper blade 110 to a deployed position in which the windshield wiper blade 110 is spaced apart from the vehicle windshield 150, in response to detecting an accumulation of the substance. In some embodiments, the process illustrated by FIG. 2 may end here. In other embodiments, the one or more processors 105 may continue to periodically monitor the vehicle 100 (block 14) with the one or more optical sensors 108 to determine if an accumulation of a substance has formed on the vehicle 100.

Referring now to FIG. 6, a view of the interior 101 of the vehicle 100 directed toward the windshield 150 of the vehicle 100 is again depicted. However, in this view, it is shown to be precipitating 201 (e.g., snowing) in the environment of the vehicle 100. In this case though, no accumulation of a substance has yet formed on the vehicle 100. In this case, the one or more processors 105 would not detect an accumulation of a substance on the vehicle 100 based on the optical signal output by the one or more optical sensors 108. As such, the one or more processors 105 would not deploy the windshield wiper blades 110 to a deployed position in which the windshield wiper blade 110 is spaced apart from the vehicle windshield 150, in response to detecting an accumulation of the substance. As such, the one or more processors 105 would not deploy the windshield wiper blade 110 to a deployed position in which the windshield wiper blade 110 is spaced apart from the vehicle windshield 150, in response to detecting an accumulation of the substance.

Figure 7:
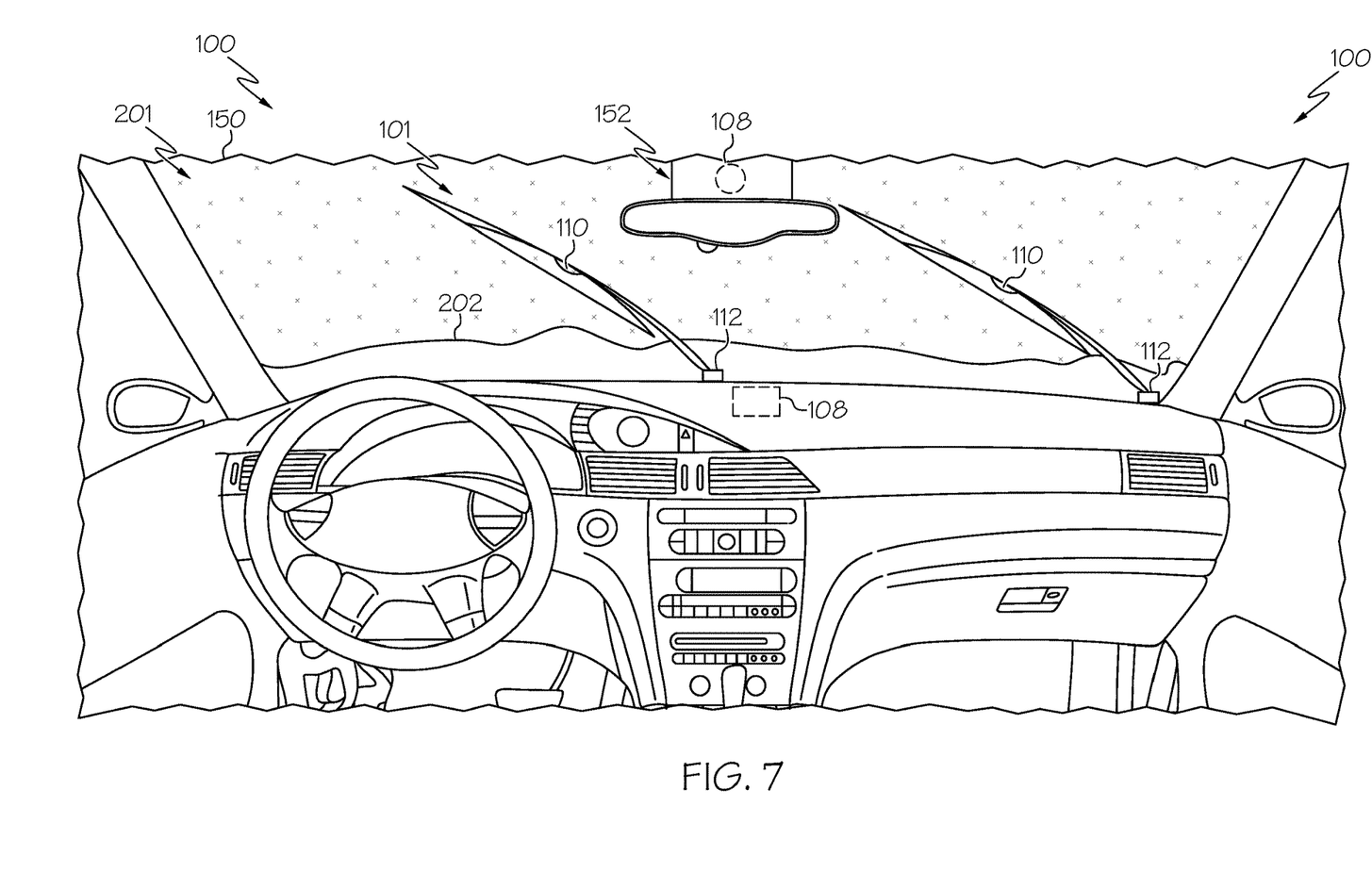
FIG. 7 depicts the interior of the vehicle of FIG. 4, wherein an accumulation has formed on the windows and the windshield wiper blades have been deployed to a deployed position, according to one or more embodiments shown and described herein.

Referring now to FIGS. 7 and 8, two alternative views of the vehicle 100 of FIGS. 5 and 6 are illustrated. In FIG. 7, the schematic interior view of the vehicle 100 directed toward the windshield 150 of the vehicle 100 is again depicted. However, in this view, there is shown to be an accumulation of a substance 202 (e.g., ice or snow) formed on the vehicle windshield 150. FIG. 8 depicts a perspective view of the exterior of the vehicle 100 with the accumulation of the substance 202 formed thereon. In this case, the one or more processors 105 would detect the accumulation of the substance 202 on the vehicle 100 based on the optical signal output by the one or more optical sensors 108. As such, the one or more processors 105 may execute logic to deploy, with the actuator 112 (shown in FIG. 1), the windshield wiper blades 110 to a deployed position in which the windshield wiper blade 110 is spaced apart from the vehicle windshield 150, in response to detecting the accumulation of the substance 202, as indicated at block 15 of FIG. 2.

It is noted that in some embodiments, there may be a threshold amount of substance accumulation that will cause the one or more processors 105 to deploy the windshield wiper blade 110 to the deployed position. For example, the one or more processors 105 may determine, based on the optical signal output by the one or more optical sensors 108, a level of light obstruction experienced by the one or more optical sensors 108. When there is an accumulation of substance 202 built up on a vehicle windshield 150, the accumulation of the substance 202 may block out light that would otherwise be detected by the one or more optical sensors 108. As such, the one or more processors 105 may determine that a threshold amount of accumulation has accumulated on the vehicle 100 when the one or more processors 105 determine that the level of light obstruction is greater than or equal to 50%, 25%, or 10%. In other embodiments, the threshold percentage may be higher or lower. In other embodiments, there is no threshold amount of accumulation of a substance 202 necessary for the one or more processors 105 to deploy the windshield wiper blade 110 to the deployed position.

In some embodiments, the one or more processors 105 may execute logic stored in the one or more memory modules 106 to periodically move the windshield wiper blade 110 and swipe it across the window to clear the accumulation of the substance 202 from the window, as indicated at block 16. Once the windshield 150 has been cleared, the one or more processors 105 may return the windshield wiper blade 110 to the deployed position, or the one or more processors 105 may leave the windshield wiper blade 110 in the un-deployed position until an accumulation of a substance 202 is again detected by the one or more optical sensors 108.

Figure 3:
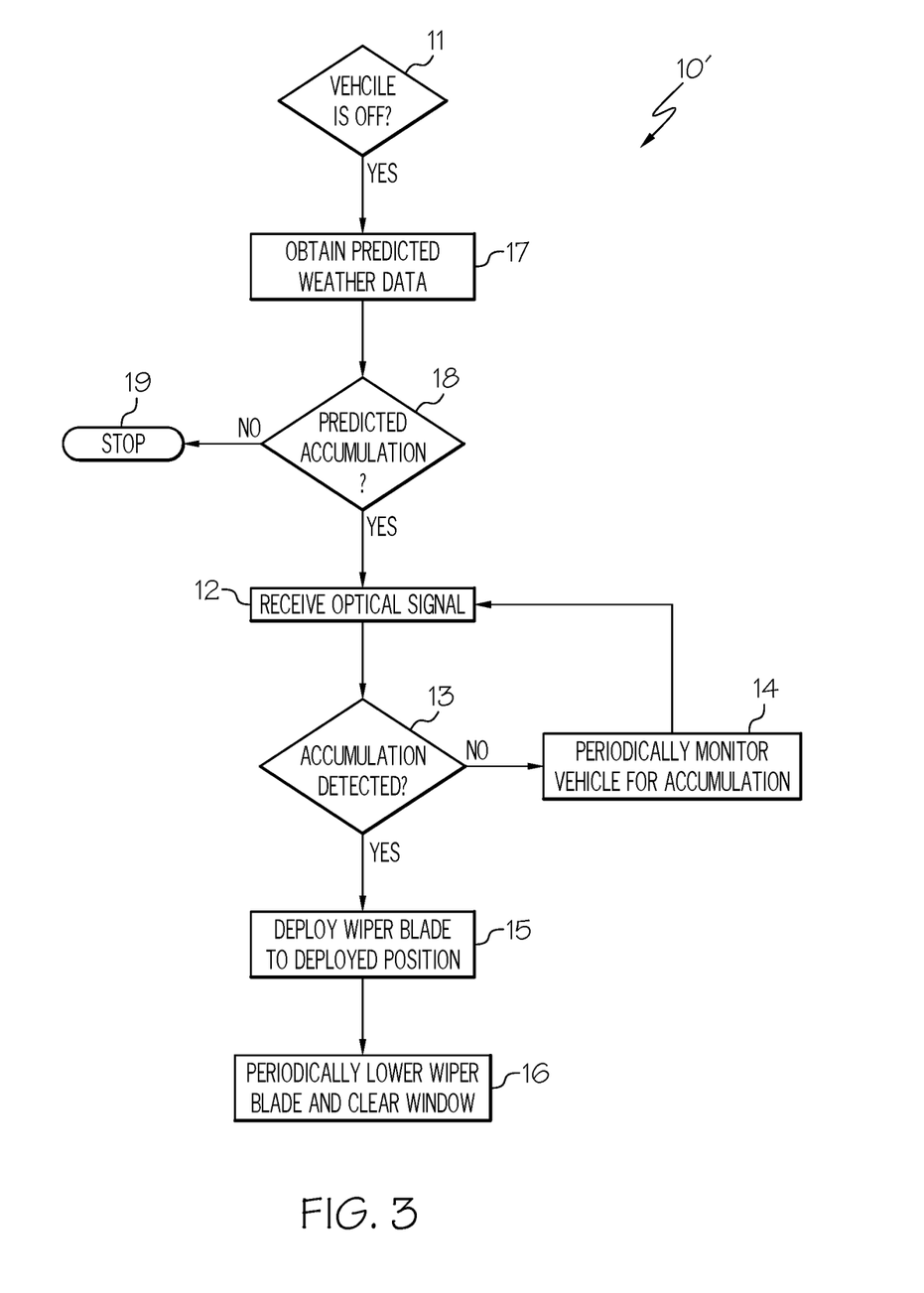
FIG. 3 depicts another flowchart illustrating a method for automatically deploying a windshield wiper blade to a deployed position, according to one or more embodiments shown and described herein.

Referring now to FIG. 3, another flowchart 10' for automatically deploying a windshield wiper blade 110 to a deployed position including steps additional to those shown in FIG. 2 is depicted. Referring also to FIG. 1, in some embodiments, the system 102 includes network interface hardware 117 communicatively coupled to the one or more processors 105. As described herein, the system 102 may communicate with the network interface hardware 117 over a network 170 to receive predicted weather data 200 from one or more remote servers, as indicated at block 17 of FIG. 3. The predicted weather data 200 may include, but is not limited to, predicted accumulations (e.g., snow fall, ice accumulation, etc.), temperature, and estimated time of predicted accumulations. The one or more processors 105 may use the predicted weather data 200 to determine, based on the predicted weather data 200, whether there is a likelihood of a predicted accumulation of a substance accumulating on the vehicle 100, as indicated as block 18. If it is determined that there is a likelihood of a predicted accumulation of a substance accumulating on the vehicle 100, the one or more processors 105 may execute logic to cause the one or more optical sensors 108 to monitor the vehicle 100 for the predicted accumulation to accumulate on the vehicle 100 in response to determining that there is a likelihood of the predicted accumulation, as indicated at block 14. In some embodiments, the timer 119 may be used to cause the system 102 to wait to check whether the predicted accumulation has formed at a time predicted by the predicted weather data 200. In some embodiments, wherein the one or more processors 105 determine in response to the predicted weather data 200 that there is no predicted accumulation, the process may stop there as indicated at block 19. In some embodiments, the system 102 may not utilize predicted weather data 200.

Referring now to FIG. 4, another flowchart 10″ for automatically deploying a windshield wiper blade 110 to a deployed position including steps additional to those shown in FIG. 2 is depicted. Referring also to FIG. 1, in some embodiments, the system 102 may also include a temperature sensor 114 for outputting a temperature signal indicative of the temperature of the environment of the vehicle 100. Referring to block 20, the one or more processors 105 may receive the temperature signal from the temperature sensor 114 to determine a current temperature of an environment of the vehicle 100. Referring to block 21, the one or more processors 105 may then determine, based on the temperature signal output by the temperature sensor 114, if the temperature of the environment of the vehicle 100 is less than a threshold temperature. For example, the threshold temperature may be any temperature below which it is possible for snow and ice to form. For example, in some embodiments, the threshold temperature may be above 32° F., such as 42° F., 38° F., 36° F., or 34° F. Temperatures below the threshold temperature may provide an increased chance of an accumulation of a substance forming on the vehicle 100. If it is determined by the one or more processors 105 based on the temperature signal of the temperature sensor 114 that the environment of the vehicle 100 is at a temperature below the threshold temperature, it may be determined that there is a likelihood of an accumulation of a substance accumulating on the vehicle 100. In this case, the one or more processors 105 may execute logic to cause the one or more optical sensors 108 to monitor the vehicle 100 for the accumulation of the substance to accumulate on the vehicle 100, as indicated at block 14. If the temperature determined from the temperature signal of the temperature sensor 114 is too high for an accumulation to form on the vehicle 100, than the system 102 may not monitor the vehicle 100 for an accumulation and the process might stop there, as indicated at block 19. In some embodiments, there may not be a temperature sensor 114.

As described above, in some embodiments, the system 102 includes a manual deployment sensor 118 communicatively coupled to the one or more processors 105 that outputs a manual deployment signal indicative of the windshield wiper blade 110 having been manually deployed to a deployed position. The one or more processors 105 may cause this information of manual deployment to be stored on the one or more memory modules 106 as manual deployment data. The manual deployment data may be associated with at least one of a time of day, a day of a week, and a month of year. The one or more processors 105 may then execute a predictive algorithm using the manual deployment data to determine when the windshield wiper blade 110 is likely to be manually placed in a deployed position. For example, and not as a limitation, if it is determined, based on the predictive algorithm, that a user generally manually deploys her windshield wiper blade 110 to a deployed position at 8 AM on Wednesdays, it may be surmised that the user generally parks the vehicle 100 outside on Wednesdays at 8 AM and it may be prudent to monitor the vehicle 100 for an accumulation to form thereon on that day after 8 AM. As such, if on a particular day, the one or more processors 105 determines that the user generally places the windshield wiper blade 110 into the deployed position, the one or more processors 105 may execute logic to cause the one or more optical sensors 108 to monitor the vehicle 100 for an accumulation of a substance to accumulate on the vehicle 100. In some embodiments, there may be no manual deployment sensor 118.

In some embodiments, the system 102 will automatically move the windshield wiper blade 110 to an un-deployed position (as shown in FIG. 5) when it is determined, based on an vehicle on/off signal of the vehicle on/off sensor 116, that the vehicle 100 is starting. In some embodiments, wherein the vehicle 100 has a remote start feature, the windshield wiper blade 110 may remain in the deployed position until it is determined that the user has entered the vehicle 100. The user having entered the vehicle 100 may be determined in a variety of ways. Some non-limiting examples include, the one or more processors 105 may be communicative coupled to: an occupant sensor (not shown) configured that outputs a signal indicative of an occupant entering the vehicle 100, a key sensor (not shown) configured to output a signal indicative of the key being within the vehicle 100, a door sensor (not shown) configured to output a signal indicative of the door of the vehicle 100 opening. In yet further embodiments, the windshield wiper blade 110 may remain in the deployed position until it is determined that the vehicle 100 has been placed within a driving gear (e.g., drive or reverse). In such embodiments, the system 102 may further include one or more driving mode sensors (not shown). The one or more driving mode sensors may be configured to detect whether the vehicle 100 has been placed in a driving mode or a non-driving mode. For example, and not as a limitation, the one or more driving mode sensors may be communicatively coupled with a gear shifter (not shown) of the vehicle 100 and may output a driving mode signal indicative of the gear in which the vehicle 100 has been placed.

It should now be understood that the systems, vehicles, and methods described herein allow a windshield wiper blade of a vehicle to be automatically deployed to a deployed position when it is determined that an accumulation has formed on the vehicle. Furthermore, the systems, vehicles, and methods described herein allow for the periodic monitoring of the vehicle for an accumulation to form. Accumulations such as ice and snow may cause the windshield wipers to become frozen to the vehicle such that they will not work until the vehicle has thawed. By automatically deploying the windshield wipers to a deployed position when it is determined that an accumulation has formed on the windshield, the windshield wiper blades may remain in working order and not be frozen to the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for automatically deploying a windshield wiper blade to a deployed position in which the windshield wiper blade is spaced apart from a vehicle windshield, the system comprising:
one or more processors;
an actuator coupled to the windshield wiper blade and configured to selectively deploy the windshield wiper blade to the deployed position in which the windshield wiper blade is spaced apart from the vehicle windshield, wherein the actuator is communicatively coupled to the one or more processors;
one or more optical sensors communicatively coupled to the one or more processors that output an optical signal; and
one or more memory modules communicatively coupled to the one or more processors that store logic that when executed by the one or more processors cause the one or more processors to:
receive the optical signal output by the one or more optical sensors;
detect whether an accumulation of a substance has formed on the vehicle windshield based on the optical signal output by the one or more optical sensors; and
deploy, with the actuator, the windshield wiper blade to the deployed position in which the windshield wiper blade is spaced apart from the vehicle windshield in response to detecting the accumulation of the substance.

2. The system of claim 1, further comprising network interface hardware communicatively coupled to the one or more processors, wherein the logic stored in the one or more memory modules further causes the one or more processors to:
receive predicted weather data with the network interface hardware;
determine, based on the predicted weather data, whether there is a likelihood of a predicted accumulation of the substance on the vehicle windshield; and
monitor, with the one or more optical sensors, the vehicle windshield for the predicted accumulation of the substance in response to determining the likelihood of the predicted accumulation of the substance.

3. The system of claim 1, further comprising a temperature sensor communicatively coupled to the one or more processors that outputs a temperature signal indicative of a temperature of an environment of a vehicle, wherein the logic stored in the one or more memory modules further causes the one or more processors to:
receive the temperature signal output by the temperature sensor;
determine the temperature of the environment of the vehicle based on the temperature signal output by the temperature sensor; and
monitor the vehicle for the accumulation of the substance with the one or more optical sensors in response to determining that the temperature is less than a threshold temperature.

4. The system of claim 3, wherein the logic stored in the one or more member modules cause the one or more processors to:
deploy the windshield wiper blade to the deployed position in which the windshield wiper blade is spaced apart from the vehicle windshield when both the temperature is less than the threshold temperature and the accumulation of the substance is detected on the vehicle windshield; and
maintain the windshield wiper blade in an un-deployed position in which the windshield wiper blade is in contact with the vehicle windshield when the temperature is greater than the threshold temperature.

5. The system of claim 1, wherein the logic stored in the one or more memory modules further causes the one or more processors to:
detect whether the accumulation of the substance has formed on the vehicle windshield by determining a level of light obstruction based on the optical signal output by the one or more optical sensors; and
deploy, with the actuator, the windshield wiper blade to the deployed position in which the windshield wiper blade is spaced apart from the vehicle windshield, in response to detecting the accumulation of the substance when it is determined that, based on the optical signal output by the one or more optical sensors, a threshold amount of the accumulation of the substance has accumulated on the vehicle windshield.

6. The system of claim 2, wherein after the windshield wiper blade has been deployed to the deployed position in which the windshield wiper blade is spaced apart from the vehicle windshield, the logic stored in the one or more memory modules further cause the one or more processors to periodically move the windshield wiper blade, with the actuator, to an un-deployed position in which the windshield wiper blade is in contact with the vehicle windshield, and swipe the windshield wiper blade across the vehicle windshield.

7. The system of claim 1, wherein the logic stored in the one or more memory modules further causes the one or more processors the move the windshield wiper blade, with the actuator, to an un-deployed position in which the windshield wiper blade is in contact with the vehicle windshield, from the deployed position in which the windshield wiper blade is spaced apart from the vehicle windshield, when it is determined that the vehicle starts up.

8. A vehicle for automatically deploying a windshield wiper blade to a deployed position, the vehicle comprising:
a vehicle windshield;
a windshield wiper blade configured to be moved between an un-deployed position in which the windshield wiper blade is in contact with the vehicle windshield and a deployed position in which the windshield wiper blade is spaced apart from the vehicle windshield;
one or more processors;
an actuator coupled to the windshield wiper blade and configured to selectively deploy the windshield wiper blade to the deployed position in which the windshield wiper blade is spaced apart from the vehicle windshield, wherein the actuator is communicatively coupled to the one or more processors;
one or more optical sensors communicatively coupled to the one or more processors that output an optical signal; and
one or more memory modules communicatively coupled to the one or more processors that store logic that when executed by the one or more processors cause the one or more processors to:
receive the optical signal output by the one or more optical sensors;

detect whether an accumulation of a substance has formed on the vehicle windshield based on the optical signal output by the one or more optical sensors; and deploy, with the actuator, the windshield wiper blade to the deployed position in which the windshield wiper blade is spaced apart from the vehicle windshield in response to detecting the accumulation of the substance.

9. The vehicle of claim 8, further comprising network interface hardware communicatively coupled to the one or more processors, wherein the logic stored in the one or more memory modules further causes the one or more processors to:

receive predicted weather data with the network interface hardware;

determine, based on the predicted weather data, whether there is a likelihood of a predicted accumulation of the substance on the vehicle windshield; and monitor, with the one or more optical sensors, the vehicle windshield for the predicted accumulation of the substance in response to determining the likelihood of the predicted accumulation of the substance.

10. The vehicle of claim 8, further comprising a temperature sensor communicatively coupled to the one or more processors that outputs a temperature signal indicative of a temperature of an environment of a vehicle, wherein the logic stored in the one or more memory modules further causes the one or more processors to:

receive the temperature signal output by the temperature sensor;

determine the temperature of the environment of the vehicle based on the temperature signal output by the temperature sensor; and monitor the vehicle for the accumulation of the substance with the one or more optical sensors in response to determining that the temperature is less than a threshold temperature.

11. The vehicle of claim 10, wherein the logic stored in the one or more member modules cause the one or more processors to:

deploy the windshield wiper blade to the deployed position in which the windshield wiper blade is spaced apart from the vehicle windshield when both the temperature is less than the threshold temperature and the accumulation of the substance is detected on the vehicle windshield; and maintain the windshield wiper blade in an un-deployed position in which the windshield wiper blade is in contact with the vehicle windshield when the temperature is greater than the threshold temperature.

12. The vehicle of claim 8, wherein the logic stored in the one or more memory modules further causes the one or more processors to:

detect whether the accumulation of the substance has formed on the vehicle windshield by determining a level of light obstruction based on the optical signal output by the one or more optical sensors; and deploy, with the actuator, the windshield wiper blade to the deployed position in which the windshield wiper blade is spaced apart from the vehicle windshield, in response to detecting the accumulation of the substance when it is determined that, based on the optical signal output by the one or more optical sensors, a threshold amount of the accumulation of the substance has accumulated on the vehicle windshield.

13. The vehicle of claim 8, wherein after the windshield wiper blade has been deployed to the deployed position in which the windshield wiper blade is spaced apart from the vehicle windshield, the logic stored in the one or more memory modules further cause the one or more processors to periodically move the windshield wiper blade, with the actuator, to an un-deployed position in which the windshield wiper blade is in contact with the vehicle windshield, and swipe the windshield wiper blade across the vehicle windshield.

14. The vehicle of claim 8, wherein the logic stored in the one or more memory modules further causes the one or more processors the move the windshield wiper blade, with the actuator, to an un-deployed position in which the windshield wiper blade is in contact with the vehicle windshield, from the deployed position in which the windshield wiper blade is spaced apart from the vehicle windshield, when it is determined that the vehicle starts up.

15. A method to automatically deploy a windshield wiper blade to a deployed position, the method comprising:

receiving an optical signal output from one or more optical sensors;

detecting whether an accumulation of a substance has formed on a vehicle windshield based on the optical signal output by the one or more optical sensors; and deploying, with an actuator, the windshield wiper blade to the deployed position in which the windshield wiper blade is spaced apart from the vehicle windshield in response to detecting the accumulation of the substance.

16. The method of claim 15, further comprising:

receiving predicted weather data with network interface hardware;

determining, based on the predicted weather data, whether there is a likelihood of a predicted accumulation of the substance on the vehicle windshield; and monitoring with the one or more optical sensors, the vehicle windshield for the predicted accumulation of the substance in response to determining the likelihood of the predicted accumulation of the substance.

17. The method of claim 15, further comprising:

receiving a temperature signal output by a temperature sensor;

determining a temperature of an environment of a vehicle based on the temperature signal output by the temperature sensor; and monitoring the vehicle for the accumulation of the substance with the one or more optical sensors in response to determining that the temperature is less than a threshold temperature.

18. The method of claim 17, further comprising:

deploying the windshield wiper blade to the deployed position in which the windshield wiper blade is spaced apart from the vehicle windshield when both the temperature is less than the threshold temperature and the accumulation of the substance is detected on the vehicle windshield; and maintaining the windshield wiper blade in an un-deployed position in which the windshield wiper blade is in contact with the vehicle windshield when the temperature is greater than the threshold temperature.

19. The method of claim 15, further comprising, after deploying, with the actuator, the windshield wiper blade to the deployed position in which the windshield wiper blade is spaced apart from the vehicle windshield, in response to detecting the accumulation of the substance:

periodically moving the windshield wiper blade, with the actuator, to an un-deployed position in which the windshield wiper blade is in contact with the vehicle windshield; and swiping the windshield wiper blade across the vehicle windshield.

20. The method of claim 15, further comprising moving the windshield wiper blade, with the actuator, to an un-deployed position in which the windshield wiper blade is in contact with the vehicle windshield, from the deployed position in which the windshield wiper blade is spaced apart from the vehicle windshield, when it is determined that the vehicle starts up.

* * * * *

UNITED STATES PATENT AND TRADEMARK OFFICE
CERTIFICATE OF CORRECTION

Page 1 of 1

PATENT NO.       : 10,661,757 B2
APPLICATION NO.  : 15/276279
DATED            : May 26, 2020
INVENTOR(S)      : Sergei I. Gage and Arata Sato It is certified that error appears in the above-identified patent and that said Letters Patent is hereby corrected as shown below:

In the Drawings

In drawing sheet(s) 2 of 8, figure 2, block 11, delete "VEHCILE" and insert --VEHICLE--, therefor.

In drawing sheet(s) 3 of 8, figure 3, block 11, delete "VEHCILE" and insert --VEHICLE--, therefor.

In drawing sheet(s) 4 of 8, figure 4, block 11, delete "VEHCILE" and insert --VEHICLE--, therefor.

Signed and Sealed this
Seventh Day of July, 2020

Andrei Iancu
*Director of the United States Patent and Trademark Office*